(12) United States Patent
McClure et al.

(10) Patent No.: US 8,333,059 B2
(45) Date of Patent: Dec. 18, 2012

(54) BALER DIRECT FEED PICKUP

(75) Inventors: John R. McClure, New Holland, PA (US); W. Dale Hotaling, New Holland, PA (US); Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 41 days.

(21) Appl. No.: 12/975,387

(22) Filed: Dec. 22, 2010

(65) Prior Publication Data

US 2012/0159918 A1    Jun. 28, 2012

(51) Int. Cl.
A01D 39/00 (2006.01)
A01D 43/02 (2006.01)
A01D 75/00 (2006.01)

(52) U.S. Cl. .......................................... 56/341
(58) Field of Classification Search ............. 56/341, 56/16.6; 100/88, 87
See application file for complete search history.

(56) References Cited

U.S. PATENT DOCUMENTS

| | | | |
|---|---|---|---|
| 3,462,922 A | 8/1969 | Phillipd et al. | |
| 4,782,651 A | 11/1988 | Ratzlaff | |
| 5,595,055 A | 1/1997 | Horchler, Jr. et al. | |
| 5,819,515 A * | 10/1998 | Ratzlaff et al. | 56/341 |
| 5,848,523 A | 12/1998 | Engel et al. | |
| 5,941,168 A | 8/1999 | Kluver et al. | |
| 6,029,434 A * | 2/2000 | Ratzlaff et al. | 56/341 |
| 6,050,074 A | 4/2000 | Clostermeyer | |
| 6,279,304 B1 | 8/2001 | Anstey et al. | |
| 6,477,824 B2 | 11/2002 | Preheim | |
| 6,601,375 B1 | 8/2003 | Grahl et al. | |
| 6,651,418 B1 * | 11/2003 | McClure et al. | 56/341 |
| 6,679,042 B1 | 1/2004 | Schrag et al. | |
| 6,874,311 B2 * | 4/2005 | Lucand et al. | 56/341 |
| 6,910,325 B2 | 6/2005 | Viaud | |
| 6,948,300 B1 * | 9/2005 | Bandstra et al. | 56/341 |
| 7,204,074 B2 * | 4/2007 | Bandstra et al. | 56/341 |
| 7,275,360 B2 * | 10/2007 | Viaud | 56/341 |
| 7,404,283 B2 | 7/2008 | Viaud | |
| 2006/0075736 A1 * | 4/2006 | Viaud | 56/341 |

FOREIGN PATENT DOCUMENTS

JP    02258197 A    10/1990

* cited by examiner

*Primary Examiner* — Arpad Fabian-Kovacs
(74) *Attorney, Agent, or Firm* — Patrick M. Sheldrake

(57) ABSTRACT

A crop converging apparatus for a round baler having a pickup unit wider than the bale chamber. The converging apparatus comprises a pair of converging augers laterally situated along a common axis on opposing sides of the pickup unit feed table and forwardly adjacent to the bale chamber infeed opening. The converging augers and related shrouds are configured to shift the lateral converging zone of the augers rearward in relation to the auger structure to a position behind the plane of the infeed opening.

19 Claims, 4 Drawing Sheets

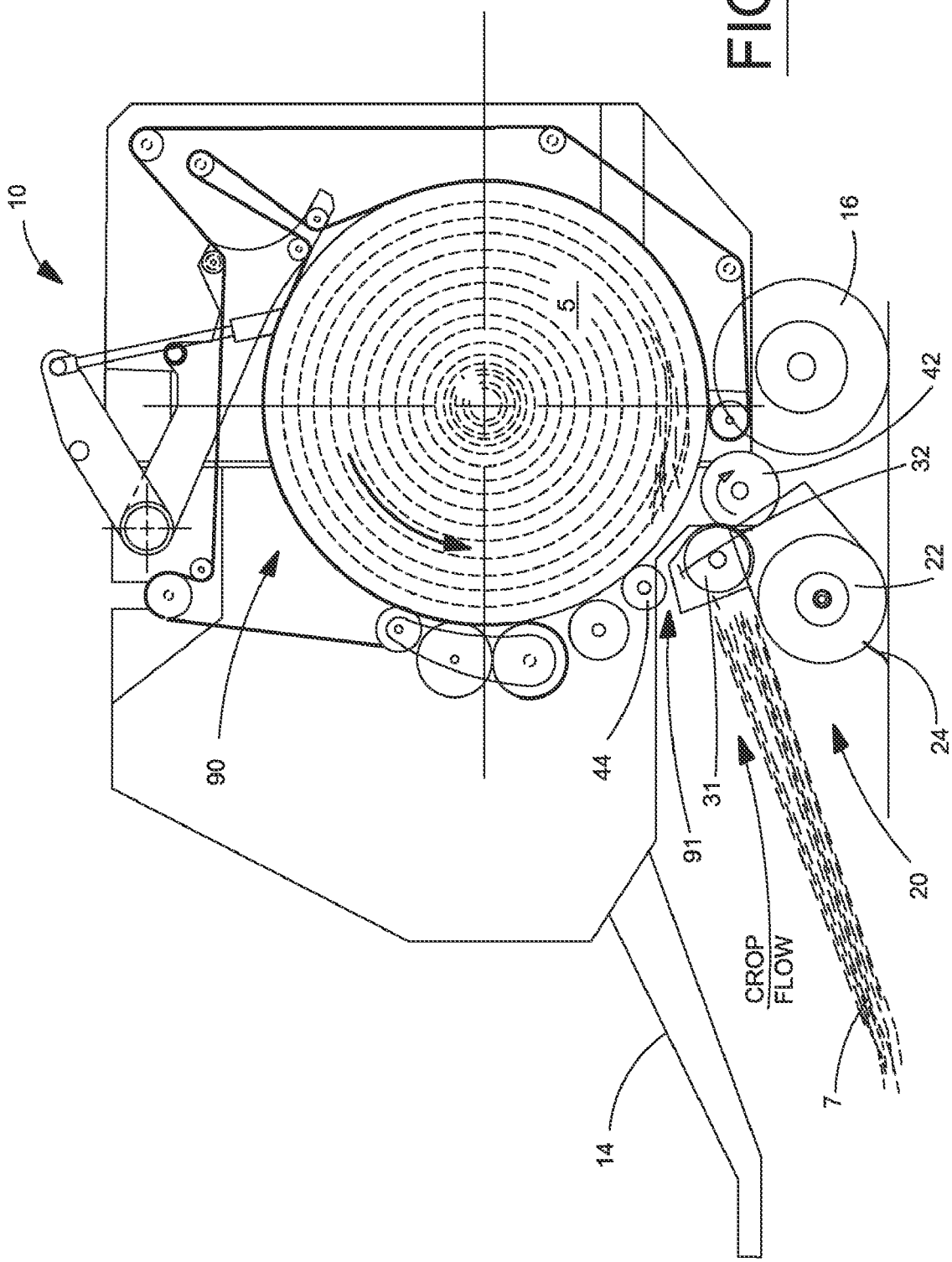

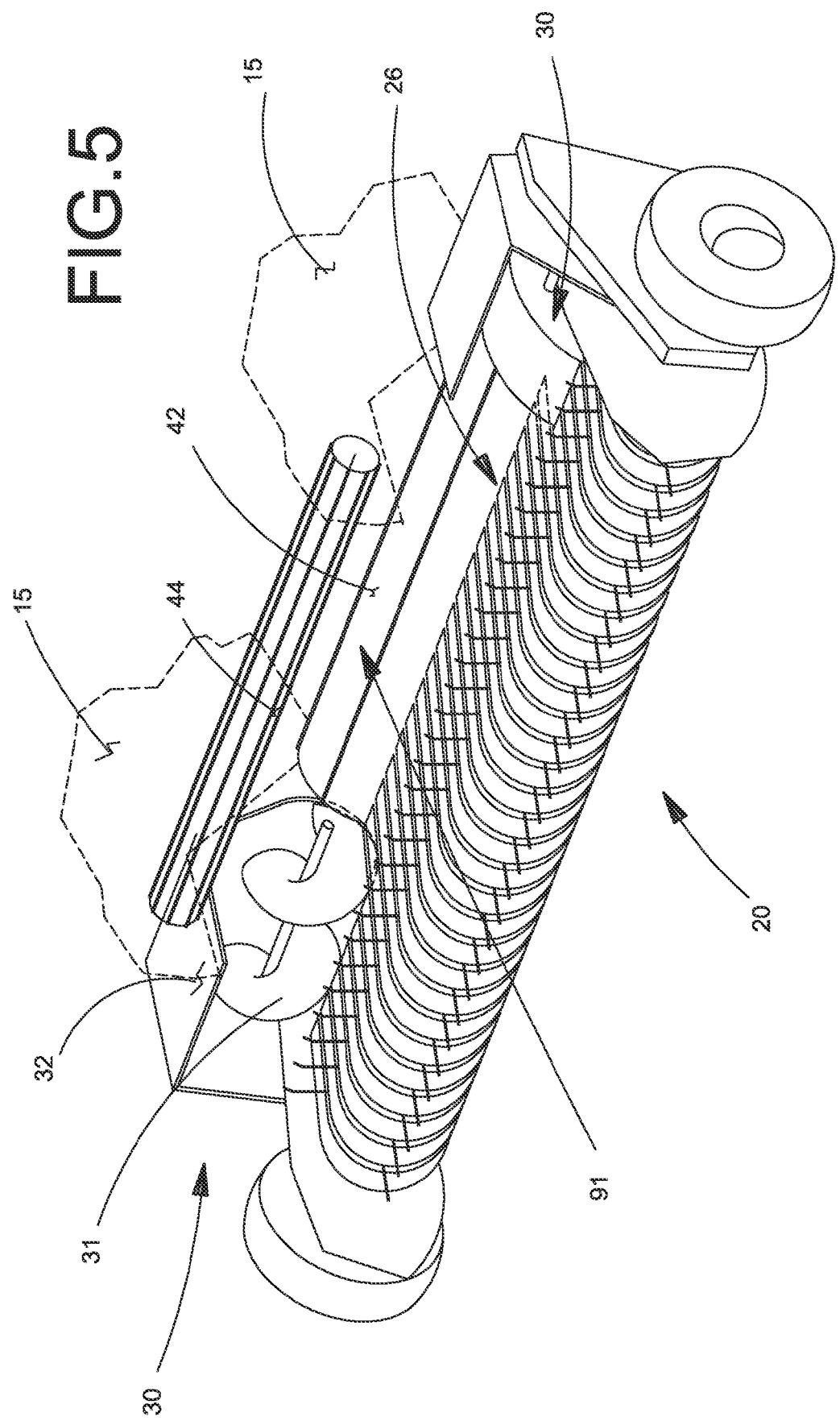

BALER DIRECT FEED PICKUP

BACKGROUND OF THE INVENTION

The present invention relates generally to a baler for forming cylindrical bales of crop material, commonly referred to as a round baler, and more particularly to an improvement in a converging apparatus for a round baler pickup that is wider than the bale forming chamber of the baler.

Round balers rely on a pickup apparatus with a set of tines that engage a windrow of crop material on the ground and lift it upwardly and then urge it rearwardly to a transverse infeed opening into a bale-forming chamber. Pressure to increase efficiency in crop packaging operations has resulted in the prevalence of crop pickup units that are significantly wider than the bale forming chamber into which the crop material is fed. A wider pickup allows the baler to handle wider crop windrows and also results in better crop fill at the lateral extremes of the resultant bale. Historically, wide pickups have incorporated augers situated at the extremes of the pickup width to converge the crop laterally inwardly to achieve a width of the crop mat being fed into the bale chamber that is approximately the same as the chamber width. Longitudinal placement of the converging augers requires an elongated feed table, increasing the distance the crop must travel between the pickup tines and the bale chamber inlet opening. A secondary feed mechanism, such as a staffer or rotor, is often necessary to convey the converged crop mat along the lengthened feed table and into the bale chamber.

Although quite effective, secondary feed mechanisms add complexity and cost. Without them, the potential for dogging the bale chamber infeed opening increases. Efforts to eliminate the secondary feed mechanism has focused on the positioning the lateral converging augers mounted on the pickup unit as dose as possible to the crop inlet opening. Some efforts include the use of multiple parallel augers to provide greater lateral force on the crop mat and to prevent crop overrun of a single auger and the resultant crop loss from the baler. While such designs may reduce the need for a secondary feed mechanism, the benefits are offset by the increased complexity in the converging apparatus.

It would be a great advantage to provide a converging apparatus for use on a round baler having a pickup unit substantially wider than the bale forming chamber that eliminates the need for a secondary pickup feed mechanism, reduces the likelihood of clogging, and overcomes the above problems and limitations.

SUMMARY OF THE INVENTION

Accordingly, the present invention, in any of the embodiments described herein, may provide one or more of the following advantages:

It is an object of the present invention to provide a crop converging apparatus for a pickup unit on a round baler that is situated immediately forwardly adjacent to the baler inlet opening to eliminate the need for a secondary feed apparatus on the crop pickup unit.

It is a further object of the present invention to provide a crop converging apparatus that will direct incoming crop material from the outboard portions of a pickup unit directly into the bale chamber infeed throat opening.

It is a further object of the present invention to provide a crop converging apparatus situated adjacent to the throat opening of the bale chamber to avoid plugging problems common in converging apparatus significantly forwardly displaced ahead of the throat opening.

It is a further object of the present invention to provide a crop converging apparatus for a round baler that situates the apparatus on the baler frame in order to maintain optimal geometry with the infeed throat opening of the bale chamber regardless of the pickup unit movement.

It is a still further object of the present invention to provide a crop converging apparatus for round baler having a wide pickup unit that streamlines the flow of crop material infed to the bale chamber to reduce the likelihood of plugging.

It is a still further object of the present invention to provide a crop converging apparatus for a round baler having a pickup unit substantially wider than the bale chamber that is durable in construction, inexpensive of manufacture, carefree of maintenance, easily assembled, and simple and effective to use.

These and other objects are achieved by providing an improved crop converging apparatus for a round baler having a pickup unit substantially wider than the bale chamber. The converging apparatus comprises a pair of converging augers laterally situated along a common axis on opposing sides of the pickup unit feed table and forwardly adjacent to the bale chamber infeed throat. The converging augers and related shrouds are configured to shift the lateral converging zone of the augers rearward in relation to the auger structure thereby improving crop inflow to the bale chamber and reducing the need for a secondary crop conveyor.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a side view of the round baler in FIG. 1 showing the relationship of the pickup unit and the bale chamber:

FIG. 5 is a partial perspective view of a crop pickup incorporating the embodiment of the invention shown in FIG. 3.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
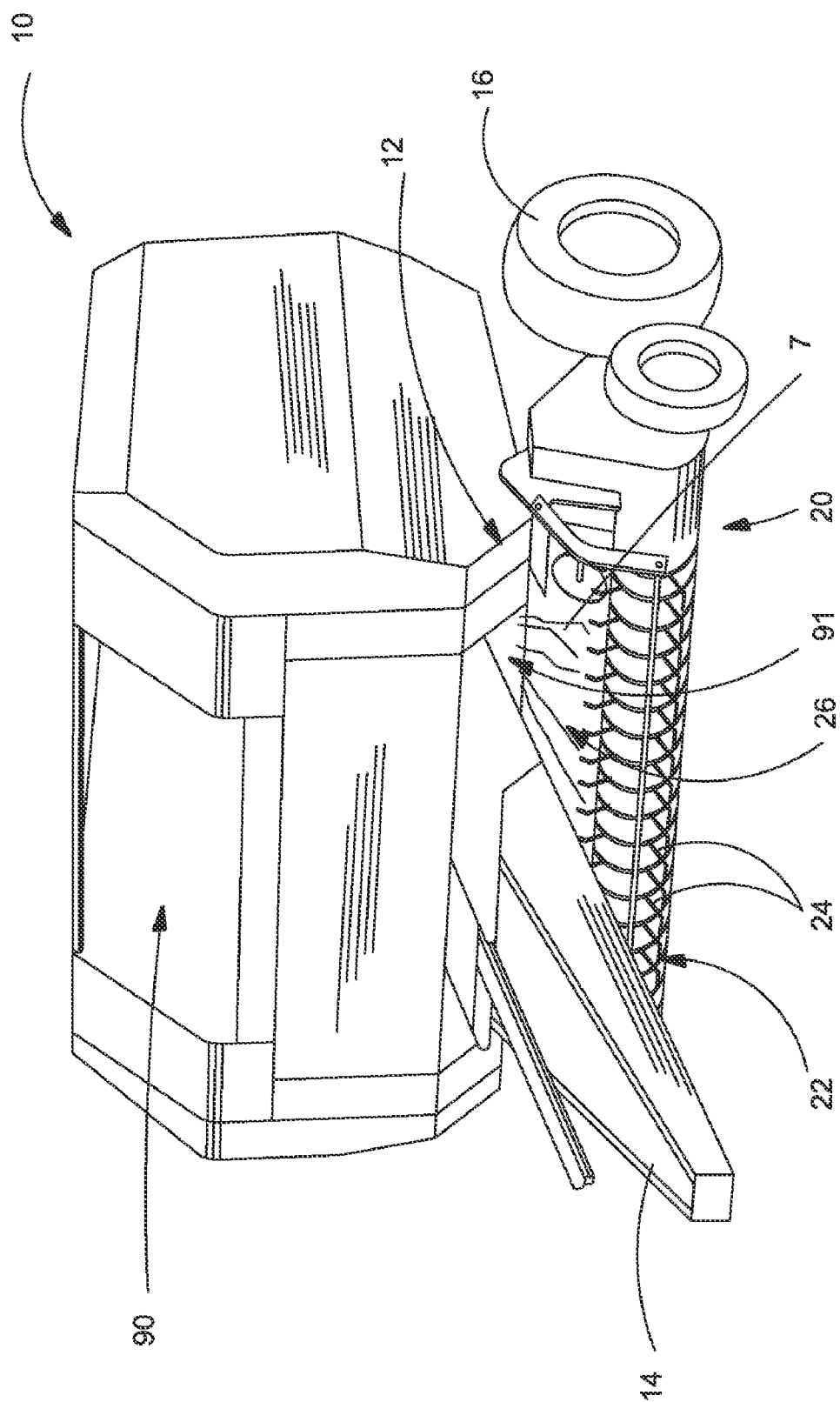
FIG. 1 shows an agricultural round baler of the type on which the present invention is useful having one embodiment of the present invention.

FIGS. 1 and 2 illustrate a round baler 10 having a frame 12, a hitch 14, a pickup assembly 20, a bale-forming chamber 90 and a pair of supporting wheels 16 (only one shown) enabling the baler to be towed along the ground by a tractor or other similar prime mover. As baler 10 is towed across a field, pick up tines 24 mounted to a rotating tine reel 22 lift crop material, usually in a windrow, from the ground and move the crop material onto a crop feeding transition area, referred to herein as the feed table 26, at the rearward portion of pickup assembly 20. Tine reels 22 typically include one or more cams to alter the angle of the tines 24 to improve crop pickup from the ground and also to accelerate the crop material rearwardly along the feed table 26 toward the bale chamber inlet opening 91.

Figure 3:
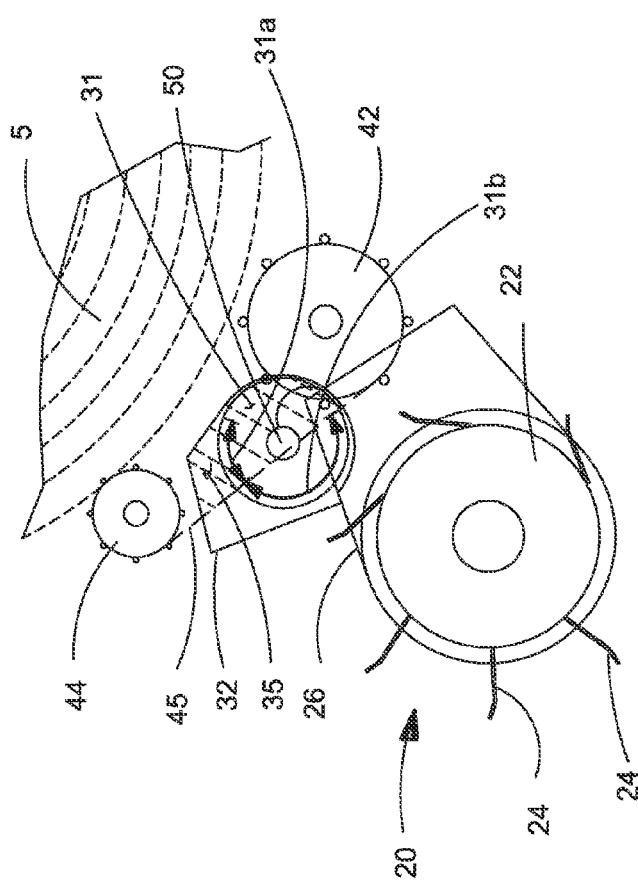
FIG. 3 is a partial side view of a crop converging apparatus incorporating a first embodiment of the present invention.

The inlet opening 91 to the bale chamber is laterally bounded by the side walls 15 (shown in FIG. 5) of the bale chamber 90. A starter roll 44 bounds the top of the inlet opening while a floor roll 42 bounds the bottom of the inlet opening. The inlet opening 91 is characterized as the position, moving in the direction of the incoming crop mat along the feed table, at which the crop material becomes engaged by rotating action of the floor and starter rolls, and the rotation of the bale in the bale chamber. Referring to FIG. 3, crop engagement commences as the crop material passes the inlet plane illustrated as 45 and as such is the crop inlet opening 91. Such engagement begins to pull the crop mat into the bale chamber and alleviates the need to push crop rearwardly toward the inlet opening. While the above description describes the upper and lower boundaries of the inlet openings as transversely arranged rolls, the present invention is equally beneficial on balers on which one or both rolls are replaced with moving belts as is well known in the art.

In applications where the pickup assembly 20 is wider than the inlet opening 91, a crop converging apparatus 30 is typically provided to laterally urge crop from the portions of the pickup assembly outboard of the inlet opening inwardly toward the inlet opening of the bale chamber. The converging apparatus 30 urges crop material laterally inwardly to establish a mat of crop material having a width matching that of the inlet opening and desired bale width, typically around four or five feet. In the embodiment shown herein, the converging apparatus 30 comprises a pair of augers 31 arranged on a common transverse axis 50, each partially surrounded by a crop deflecting shield 32 to guide the crop material into contact with the augers.

Conventionally, the addition of a converging apparatus 30 requires that the feed table 26 be elongated in order to provide the necessary space for the converging apparatus 30 between the tine reel 22 and the bale chamber inlet 91. As a result, it is common for many conventional pickup units to incorporate a secondary feeding apparatus in the feed table 26 to convey the crop mat rearwardly from the pickup assembly toward the inlet opening of the bale chamber. Such secondary feeding apparatus are necessary to keep the incoming crop mat 7 moving rearwardly between the tine reel 22 and the inlet opening 91. Inclusion of a secondary feed apparatus increases the cost and complexity of the baler.

As shown in FIGS. 2 through 5, the present invention overcomes the need for a secondary feed apparatus by positioning the converging apparatus 30 immediately adjacent and outboard of the inlet opening 91. The configuration enables the converging apparatus 30 to discharge the crop material directly into the bale chamber inlet opening 91 where it can be drawn into the bale chamber by action of the chamber feeding devices (floor 42 and starter rolls 44), enables the use of a shorter feed table, and eliminates the need for a secondary crop conveyor to keep the crop mat moving across the feed table 26.

First referring to FIGS. 2 and 3, a first embodiment of converging apparatus 30 is shown to comprise a pair of augers 31, one on each side of the inlet opening 91, and arranged on a common transverse axis. The converging apparatus 30 is connected to the pickup assembly 20 such that the augers 31 remain in a fixed position relative to the feed table 26 as the baler 10 moves across uneven terrain. The incoming crop mat 7 is lifted from the ground onto the feed table 26 by the tines 24 and propelled rearwardly toward the inlet opening 91. The incoming crop mat 7 extends generally across the entire width of the pickup, assuming sufficient crop material in the windrow, as it moves rearwardly. As the moving crop mat approaches the bale chamber inlet 91, the crop converging apparatus 30 begins to interact with the crop mat to reduce its width to that of the inlet opening 91. Converging augers 31 are positioned to fold the outboard portion of the crop mat inwardly. Unlike known converging apparatus, the converging augers 31 of the present invention are longitudinally positioned along the feed table to fold the crop mat directly into the bale chamber inlet 91.

In the embodiment presented in FIG. 3, the periphery of each converging augers 31 is slightly recessed into the plane of the feed table 26. Each auger 31 is partially surrounded by a shroud 32 which guides the crop into interaction with the auger and prevents crop material from bypassing the auger and continuing straight rearwardly where it would impinge the baler housing and fall to the ground. In order to allow the crop mat to move as far rearwardly as possible before being laterally urged by the auger 31, the shroud 32 is raised in relation to the auger 31 thereby creating a converging space, shown as area 35 in FIG. 3. The converging space 35, located rearwardly from the crop net plane 45, allows the crop mat to move further rearwardly by overrunning the top of the auger (zone 31a) than would otherwise be possible if the crop mat interacted only with the forward periphery of the auger (zone 31b). The additional rearward distance the crop mat is allowed to travel before being laterally redirected allows the crop mat to be converged directly into the inlet opening 91 where the action of the floor roll 42, the starter roll 44, and the rotation of the bale itself pulls the crop mat into the chamber thereby reducing the likelihood of jams or clogs of the incoming crop, even without a secondary crop conveyor.

Figure 4:
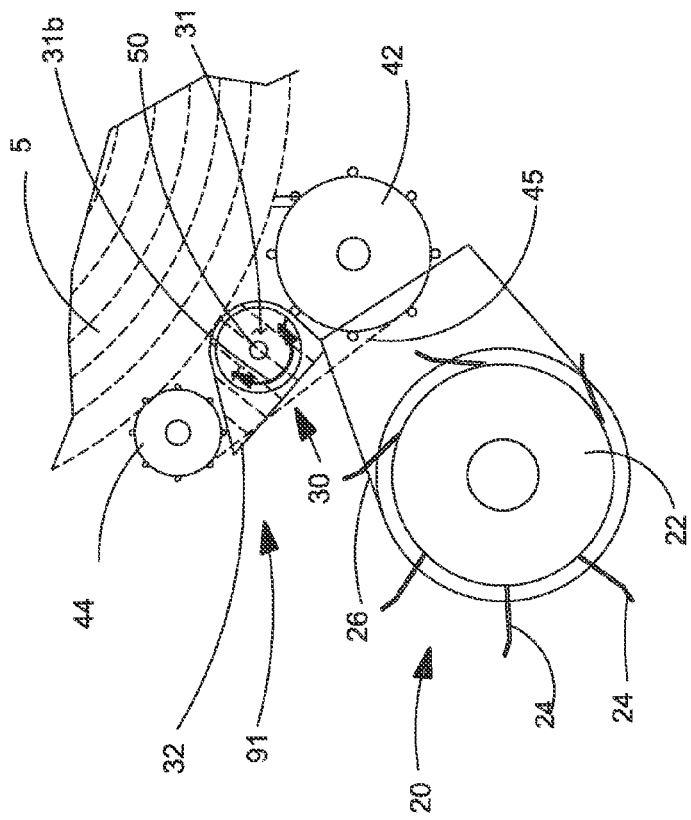
FIG. 4 is a partial side view of a crop converging apparatus incorporating a second embodiment of the present invention.

FIG. 4 shows a second embodiment of the present invention in which the converging apparatus 30 is shown comprising a pair of augers 31, one on each side of the net opening 91, and arranged on a common transverse axis 50. In this embodiment, the augers 31 are connected to the baler frame 12 itself such that the augers 31 remain in a fixed position relative to the inlet opening 91. Moving the augers 31 from the pickup assembly 20 allows them to be positioned directly on the sides of the crop inlet opening 91 rearward from the inlet plane 45. The positioning of the augers 31 in this second embodiment allows crop to move rearwardly along the feed table and reach the inlet opening, passing the crop inlet plane 45 prior to interacting with the forward periphery 31b of the converging augers 31. The crop mat is inwardly folded by interaction with the augers 31 at a position in the crop flow at which the floor and starter rolls and the rotation of the bale in the chamber are pulling the crop mat into the chamber, that is the area rearward of the crop inlet plane 45. There is no need for a secondary crop conveyor as the crop movement is virtually unimpeded until it reaches the inlet opening. Additionally, mounting the augers 31 in a fixed relationship to the crop inlet opening allow their placement to be optimized, regardless of movement of the pickup assembly as it passes over uneven terrain.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus describe the invention, what is claimed is:

1. A crop converging apparatus for a round baler comprising:
   a frame-supported bale chamber having a generally rectangular crop inlet configured to receive crop material for infeed to the bale chamber, said crop inlet laterally bounded by left and right side portions defining an inlet width and vertically bounded by spaced-apart upper and lower feed devices forming a portion of a bale forming chamber , said side portions and said forward most points of the upper and said lower feed devices in the crop flow path defining an inlet opening plane;
   a crop pickup apparatus forwardly connected to the baler, said pickup apparatus configured to lift crop material from the ground and convey crop material toward said crop inlet, said pickup apparatus having a pickup width greater than said inlet width; and
   first and second rotating crop convergers arranged on a common transverse axis adjacent to said crop inlet, one of said crop convergers disposed outboard of each said crop inlet side, said crop convergers having a circumference and positioned such that the circumference of at least one converser overlaps with the circumference of the lower roll in a side view of the baler.

2. The converging apparatus of claim 1, wherein said crop pickup apparatus further comprises a tine reel for directly crop flow rearward along a feed table toward the crop inlet wherein a majority of the auger is located above the feed table and rearward of the upper feeding device.

3. The converging apparatus of claim 2, wherein said upper and said lower feed devices are rotating rolls configured to urge the crop material into the bale chamber.

4. The converging apparatus of claim 1, wherein said first and said second crop convergers are augers.

5. The converging apparatus of claim 4, wherein said first and said second crop convergers are connected to said pickup apparatus.

6. The converging apparatus of claim 4, wherein said axis of rotation of said augers is located rearward of the inlet opening plane.

7. The converging apparatus of claim 6, wherein said converging apparatus further comprises first and second shields, each partially surrounding respective said first and second augers to create respective first and second crop convergence zones wherein crop material is urged laterally inwardly to a location rearward of said inlet opening plane.

8. The converging apparatus of claim 4, wherein said first and said second crop convergers are connected to said baler frame in a fixed relationship to said bale chamber inlet opening.

9. The converging apparatus of claim 4, wherein a majority of said auger is located rearward of the plane of the inlet.

10. A crop converging apparatus for a round baler comprising:
    a frame-supported bale chamber having a crop inlet to the bale chamber, said crop inlet being laterally bounded by side portions vertically bounded by spaced-apart upper and lower feed devices that form a portion of the bale chamber, said side portions and said forward most tangent line to both the upper and said lower feed devices defining an inlet opening plane;
    a crop pickup apparatus forwardly connected to the baler, said pickup apparatus configured to convey crop along the flow path across a feed table toward said crop inlet; and
    first and second convergence zones in a space laterally outwardly adjacent to said first and second sides, said convergence zones having respective first and second crop powered convergers, wherein at least one powered converger has an axis of rotation rearward of the inlet opening plane.

11. The converging apparatus of claim 10, wherein said first and said second crop convergers are augers partially surrounded by first and second shields, respectively, the relationship between said augers and said shields creating said convergence zones as the crop interacts with said augers and said shields.

12. The converging apparatus of claim 10, wherein the crop convergers are augers and a majority of the body of each auger is located rearward of the inlet opening plane.

13. The converging apparatus of claim 12, wherein said feed table defines a feed plane and first and second augers are positioned partially below said feed plane.

14. The converging apparatus of claim 10, wherein said first and said second crop convergers are connected to said baler frame in a fixed relationship to said bale chamber inlet opening rearward of the inlet opening plane.

15. A method for converging a mat of incoming crop material for infeed to a bale-forming chamber the bale chamber having an infeed opening comprising the steps of:
    providing spaced-apart upper and lower transversely aligned feed rollers that form a portion of the bale chamber defining upper and lower boundaries of the infeed opening, and an infeed plane forwardly simultaneously tangential to the upper and lower feed rollers;
    providing a crop pickup for lifting a windrow of crop material and conveying the crop material toward the infeed opening;
    providing first and second crop convergers arranged on a common transverse axis adjacent to the crop inlet outboard of the infeed opening, each crop converger configured to interact with a substantial portion of the crop material outboard of the crop infeed opening to laterally urge the crop material into the infeed opening at a position rearward from the infeed plane;
    the baler through a windrow of crop material to be baled;
    urging the crop by the pickup toward the infeed opening; and
    laterally directing the crop by the crop convergers to the crop infeed opening;
    whereby the crop convergers are positioned such that a majority of the crop convergers are located rearward of the infeed plane and discharged rearward of the infeed plane where it is drawn into the bale chamber by the upper and lower feed rollers.

16. The method of claim 15, wherein the first and the second crop convergers are augers having an axis of rotation rearward of the infeed plane.

17. The method of claim 16, further comprising the step of providing first and second shields partially encircling the first and second augers, respectively, the relationship between each auger and each shield creating a convergence zone in which lateral crop movement occurs, the convergence zone being rearwardly positioned from the infeed plane.

18. The method of claim 17, wherein the first and second crop converging augers are connected to the pickup and positioned partially below the plane of the feed table.

19. The method of claim 15, wherein the first and second crop converging augers are connected to the baler in a fixed relationship to the infeed opening and do not extend further forward than the infeed plane.

* * * * *